United States Patent
Robinson et al.

(10) Patent No.: US 6,704,510 B2
(45) Date of Patent: *Mar. 9, 2004

(54) PMD CHARACTERIZATION ACROSS MULTIPLE OPTICAL CHANNELS OF AN OPTICAL LINK

(75) Inventors: Andrew Niall Robinson, McKinney, TX (US); Xiaoping Charles Mao, Plano, TX (US)

(73) Assignee: WorldCom, Inc., Clinton, MS (US)

( * ) Notice: Subject to any disclaimer, the term of this patent is extended or adjusted under 35 U.S.C. 154(b) by 18 days.

This patent is subject to a terminal disclaimer.

(21) Appl. No.: 09/993,644

(22) Filed: Nov. 27, 2001

(65) Prior Publication Data

US 2002/0036811 A1 Mar. 28, 2002

Related U.S. Application Data

(63) Continuation of application No. 09/248,521, filed on Feb. 9, 1999, now Pat. No. 6,493,116.

(51) Int. Cl.[7] .............. H04J 14/02; H04B 10/00
(52) U.S. Cl. ............ 398/81; 398/17; 398/65; 398/152; 398/147
(58) Field of Search ............ 359/122, 156, 359/161, 173, 110; 398/65, 81, 147, 152, 7, 14, 17

(56) References Cited

U.S. PATENT DOCUMENTS

| | | | | |
|---|---|---|---|---|
| 5,859,939 A | 1/1999 | Fee et al. | | 385/24 |
| 5,930,414 A | 7/1999 | Fishman et al. | | 359/156 |
| 6,130,766 A | 10/2000 | Cao | | 359/161 |
| 6,266,457 B1 | 7/2001 | Jacob | | 359/156 |
| 6,271,952 B1 | 8/2001 | Epworth | | 359/161 |
| 6,421,153 B1 * | 7/2002 | Way et al. | | 359/156 |
| 6,493,116 B1 * | 12/2002 | Robinson et al. | | 359/110 |

* cited by examiner

*Primary Examiner*—Kinfe-Michael Negash

(57) ABSTRACT

A fiber optic communications link having PMD characterization across multiple optical channels to identify PMD problems. The communications link has adaptive PMD controls employed along the optical link, whereby PMD phenomena detected by instruments, such as PMD compensators, are interpreted as being either attributable to perturbation of fiber characteristics at large, or by failure of PMD equipment along the link. The present invention avoids taking unnecessary control or maintenance actions upon PMD related controllers and compensators. PMD notifications from various PMD compensators are correlated to identify which portion of the link has undergone a change in polarization characteristics to further identify PMD related errors and problems.

20 Claims, 3 Drawing Sheets

PMD CHARACTERIZATION ACROSS MULTIPLE OPTICAL CHANNELS OF AN OPTICAL LINK

This application is a continuation of application Ser. No. 09/248,521, filed Feb. 9, 1999, now U.S. Pat. No. 6,493,116.

FIELD OF THE INVENTION

The present invention relates to optical communication networks, and more particularly to a method and apparatus for monitoring the quality of optical channels of an optical link having polarization-mode dispersion (PMD) to intelligently determine and distinguish PMD problems in the optical link.

BACKGROUND OF THE INVENTION

In a typical optical communications system, an optical signal in the form of a series of light pulses is emitted from a modulated optical transmitter comprising a laser diode. Each light pulse is of extremely short duration, such as 40 ps, and is roughly Gaussian shaped as a function of time. In the frequency domain, this signal comprises numerous frequency components spaced very closely about the nominal center frequency of the optical carrier, such as 193,000 GHz. As this type of modulated optical signal passes through an optical fiber, different frequency components of the optical signal travel at slightly different speeds due to an effect known as chromatic dispersion. In the course of the optical signal traveling through a very long fiber, such as fibers that are 200 km in length, chromatic dispersion causes a single pulse of light to broaden in the time domain, and causes adjacent pulses to overlap one another, interfering with accurate reception. Fortunately, many techniques are known for compensating for chromatic dispersion.

Another form of dispersion is becoming a limiting factor in optical communications systems as progressively higher data rates are attempted. Polarization-mode dispersion (PMD) arises due to birefringence in the optical fiber. This means that for two orthogonal directions of polarization, a given fiber can exhibit differing propagation speeds. A light pulse traveling through a fiber will probably, unless some control means are employed, have its energy partitioned into polarization components that travel at different speeds. As with chromatic dispersion, this speed difference causes pulse broadening and restricts the usable bandwidth of each optical carrier.

Schemes to actively compensate for PMD generally involve detecting the presence of polarization-dependent timing differences and either: a) applying delay elements to one or the other polarization to realign the timing of pulses; or b) controlling the polarization state of the optical signal upon entry into the fiber, or at intermediate points along the fiber, such that birefringent effects are minimized or canceled out. Active compensation techniques are required because the PMD of a given fiber varies over time due to temperature and pressure changes along the fiber and due to aging. A fiber that is installed above ground can exhibit fairly rapid fluctuations in PMD due to temperature and mechanical forces. A fiber buried underground can be sensitive to loads such as street traffic or construction work.

A modulated optical signal arriving at an optical receiver must be of sufficient quality to allow the receiver to clearly distinguish the on-and-off pattern of light pulses sent by the transmitter. Conventionally, a properly designed optical link can maintain a bit-error-rate (BER) of $10^{-13}$ or better. Noise, attenuation, and dispersion are a few of the impairments that can render an optical signal marginal or unusable at the receiver. Generally, when an optical channel degrades to a bit-error-rate of $10^{-8}$, a communications system will automatically switch to an alternate optical channel that has a better BER.

One common method of analyzing the quality of a modulated optical signal is a so-called "eye diagram", shown in FIG. 1. The eye diagram consists of overlaying successive frames of time-domain traces of the signal, with each frame corresponding to one period of the nominal periodicity of the modulation. As portrayed, the vertical axis represents instantaneous intensity of the received signal, and the horizontal axis corresponds to time. Many successive traces of transmitted "ones" and "zeros" define a region or window within the middle of the display. In the time axis, the window is bound on either side by the transitional leading and trailing edges of the pulses. Using this technique, a large clear area or "window" in the center with no encroachment from any side represents a good signal in that the presence or absence of a pulse during each clock cycle is clearly distinguishable.

Noise added to a signal appears as "fuzziness" of the lines defining the window. Sufficient noise can even obliterate the appearance of the window, representing a bad signal in that "ones" and "zeros" are no longer distinguishable. Impairments in the time axis, such as chromatic dispersion or polarization mode dispersion, cause the transitional areas of the display to close in upon the window from either side. Overlapping of pulses can require more stringent synchronization of the receiver's decision point, or even render the signal unusable.

A given optical receiver will automatically adapt to receive a modulated optical signal. Automatic gain control (AGC), frequency control, and phase lock-in are typically applied in sequence so that a threshold decision circuit can best sample the signal and decode every pulse. Superimposed upon the eye-diagram, an optimal point of operation for a threshold decision circuit would intuitively be at the center of the window, as shown by the "+" in FIG. 1. This means that the intensity threshold is about halfway between the zero values and one values observed on average.

Timewise, the center of the window corresponds to sampling the pulses in the middle of their duration when they tend to be of maximum intensity also shown by the "+" in FIG. 1. Intuitively, one can see how this choice for an operating point would be the most robust against either noise or timing impairments, which cause the window to shrink.

A received optical signal can undergo some degree of change in, for example, pulse width without having an immediate impact on the BER, as observed by this optimally positioned main decision circuit. A particular type of receiver has been developed having at least two independent decision circuits of the type just described. Reference is made to an article entitled "Q-factor Measurement for High Speed Optical Transmission Systems", authored by A. J. Ramos which is from proceedings of the SubOptic '97 conference, San Francisco Calif. 1997,891, as well as an article entitled "Margin Measurement in Optical Amplifier Systems" authored by Bergano, Kerfort and Davidson, Photonics Technology Letters, 5(1993)304, the teachings of both are incorporated herein by reference. A main decision circuit is dedicated to actual communications reception and is maintained at the optimum point, once it is established, within the center of the window. But for analyzing signal quality to a finer degree and for measuring degradation before it impacts the BER of the actual communications, an auxiliary decision circuit is used to probe the extents of the operating window. Robustness to timewise disturbances is gauged by directing the auxiliary decision circuit to sample at various time offsets relative to the optimum point. Findings by the auxiliary circuit may even be used to fine-tune the optimum decision point settings of the main decision circuit.

The auxiliary decision circuit is set to a given timing offset and its output is monitored for BER, especially in comparison to the output of the main decision circuit. The BER measurement at each operating point can typically take several minutes. Gradually, BER data is accumulated for every offset value. As expected, a plot of this data resembles an inverted Gaussian curve with a minimum BER occurring some optimum offset, as shown in FIG. 2. A similar plot is derived by varying the amplitude threshold of the auxiliary decision circuit.

All of this BER data may be summarized into a "Q" factor or quality metric for the received signal. In general terms, the broader the range of timings over which a low BER can be sustained, the greater the Q factor of the signal. A receiver with an auxiliary decision circuit can measure and output such a Q factor.

The Q measurement is particularly useful for assessing and fine-tuning an optical path that is already operating at a healthy low BER. The Q measurement estimates a BER without requiring any actual bit errors to occur. A Q measurement covering the BER range of $10^{-13}$ to $10^{-20}$ may be completed in a few minutes, whereas an actual errored bit might not be observed for hours, days, or months.

When an optical path degrades, some corrective action may be necessary either to improve the optical path or to divert the communications traffic along an alternate channel or path that will work better. Yet, it is equally important to the integrity of the traffic bearing signal to avoid taking unnecessary corrective actions. Each adjustment or switching operation can temporarily disrupt the traffic-bearing signal.

Where adaptive PMD controls are employed along an optical link, PMD phenomena detected by instruments, such as PMD compensators, must be interpreted as being either attributable to perturbation of fiber characteristics at large or by failure of PMD equipment along the link. Making this distinction avoids taking unnecessary control or maintenance actions upon PMD-related controllers and compensators.

Therefore, a method and system are required for monitoring the quality of optical channels in an optical link to determine and distinguish PMD problems in the optical link across all the optical channels from PMD equipment failures along the link to avoid taking unnecessary control or maintenance actions upon PMD controller and compensators.

SUMMARY OF THE INVENTION

Accordingly, the present invention provides a method and apparatus that achieves technical advantages by providing PMD fault isolation along an optical link by correlating PMD notifications across multiple optical channels to determine if detected shifts of the PMD are attributable to bulk fiber disturbances or per-channel PMD malfunctions. The present invention provides this distinction to temper corrective actions that would normally be taken to correct PMD problems. When it is determined that the PMD of all optical channels suddenly shift, it is determined that this PMD shift is attributed to bulk fiber disturbances. On the other hand, when it is determined that the PMD of only one optical channel has shifted, then it is determined that the PMD problems are related to the associated optical channel and, thus, actions can be taken to correct the PMD problem in this channel. Making these distinctions avoids taking unnecessary control or maintenance actions upon related PMD controllers and PMD compensators.

According to a preferred method of the present invention, the method comprises performing fault management in an optical communications link having a plurality of optical channels, whereby each optical channel has associated therewith at least one PMD detector, such as a PMD compensator, generating an output indicative of PMD of the respective optical channel at the PMD detector. The method comprises the steps of obtaining a first output from a first PMD detector associated with a first optical channel, obtaining a second output from a second PMD detector associated with a second optical channel, and correlating the first output and the second output to determine a fault of the optical communications link and generate a fault signal indicative of the fault. The PMD detector outputs are correlated across multiple optical channels to determine a fault of the optical communications link, such as to determine if a PMD problem is attributed to bulk fiber disturbances, or isolated PMD detector malfunctions.

The apparatus comprises an optical fiber, an optical transmitter coupled to the optical fiber for generating a first optical channel and a second optical channel through the optical fiber, a first PMD detector and a second PMD detector, such as a PMD compensator, coupled to the optical fiber for generating a first output and a second output, respectively, indicative of PMD of the first optical channel and the second optical channel, respectively, at a first location and a fault detector coupled to the first PMD detector and the second PMD detector for generating a fault output as a function of the first output and the second output indicative of a PMD problem in the optical fiber.

In summary, the present invention provides adaptive PMD controls, such as a PMDC, to be employed along an optical fiber link a fiber, whereby PMD phenomena detected by instruments, such as PMD compensators, can be interpreted as being either attributable to perturbation of fiber characteristics at large or by failure of PMD equipment along the optical fiber link or fiber. Making this distinction avoids taking unnecessary control or maintenance actions upon PMD related controllers and compensators.

DETAILED DESCRIPTION

Figure 2:
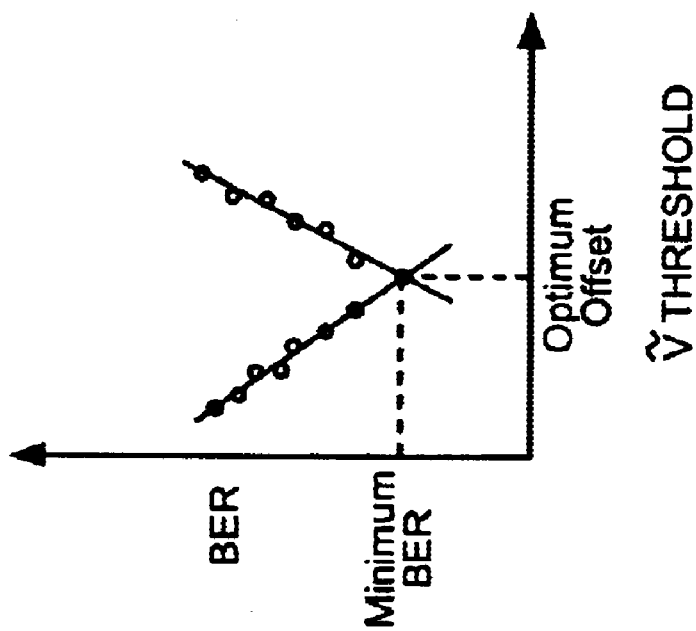
FIG. 2 is a graph of a typical BER measurement as a function of offset that can be used to determine a Q factor of an optical signal.
Figure 1:
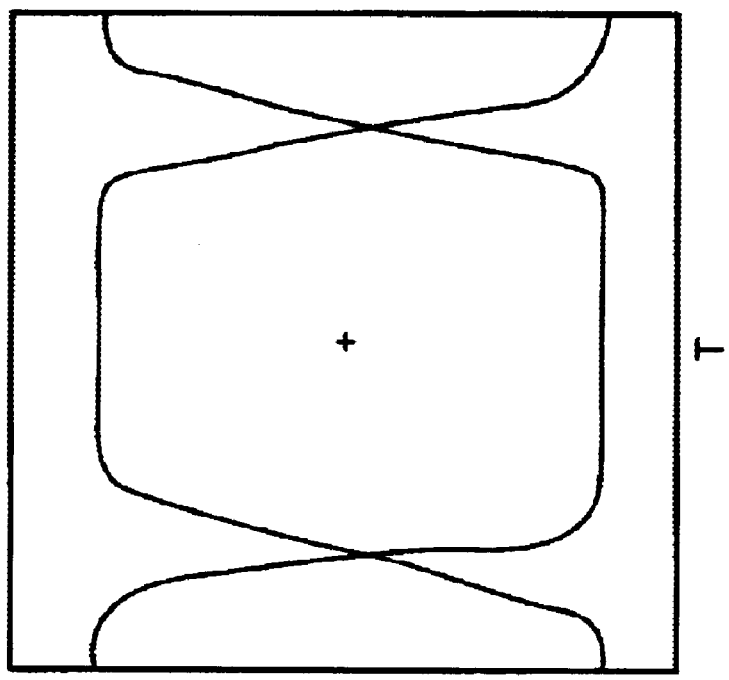
FIG. 1 illustrates an eye diagram that is typically used to analyze the quality of a modulated optical signal.
Figure 3:
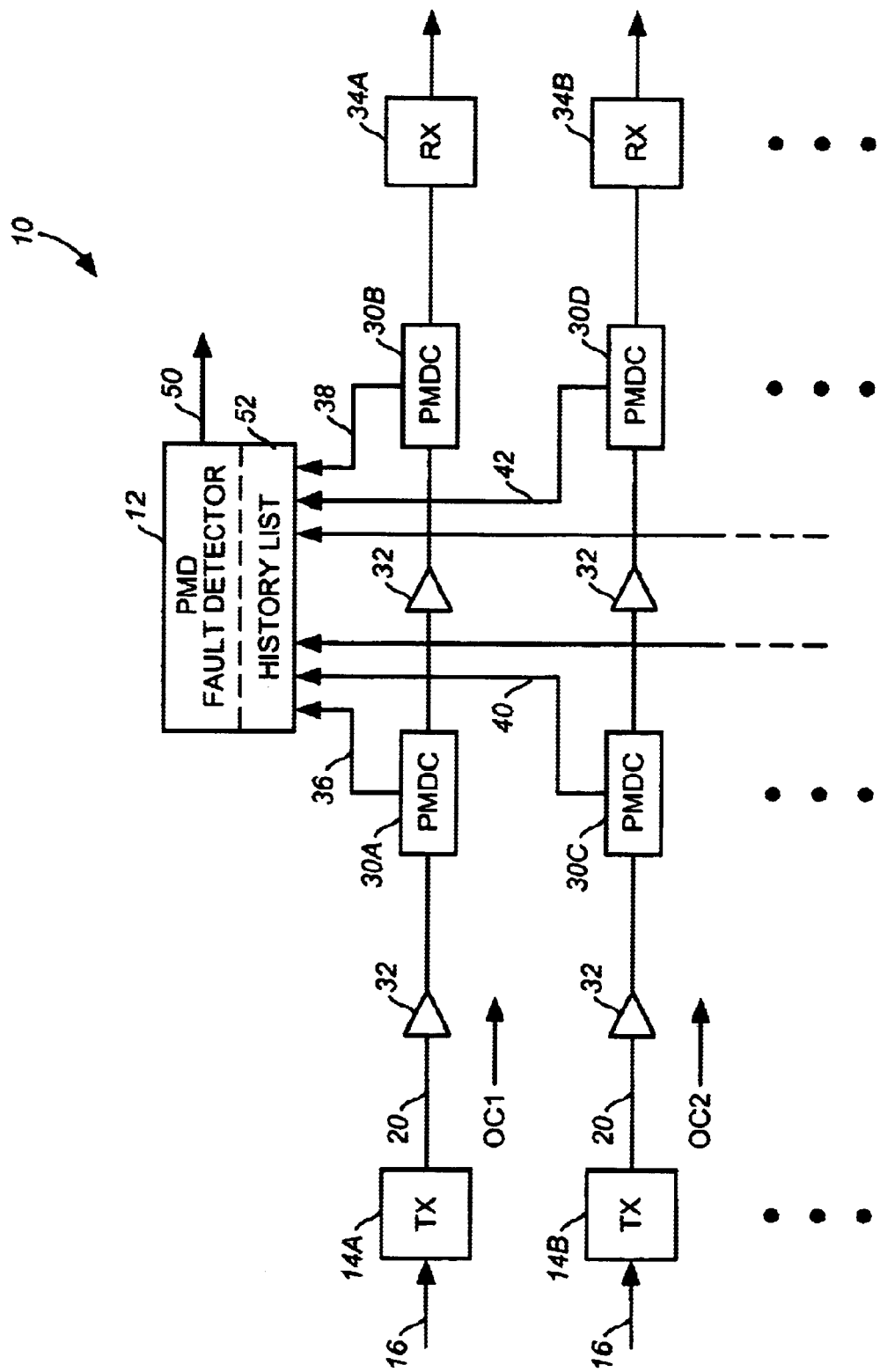
FIG. 3 is a block diagram of an optical communications system according to the present invention having a PMD fault detector coupled to the various PMD detectors across the multiple optical channels.

Referring now to FIG. 3, an optical communication system 10 is shown having a microprocessor based PMD fault detector 12 for receiving and processing several PMD indicator inputs from the system 10 and performing PMD fault isolation management according to the present invention. System 10 includes a plurality of optical transmitters 14 each having a semiconductor laser emitting light (not shown) forming an optical carrier that is intensity modulated by a corresponding electrical data signal provided on a respective input line 16. The electrical data signals can be SONET-compliant STS-48 or STS-192 synchronous data signals bearing digital data at about 2.5 Gbps or 9.9 Gbps, respectively. The intensity modulated optical carriers are delivered by each of the respective transmitters 14 into a single common optical fiber 20. The optical carrier generated by the transmitter 14A is identified as OC1. The optical carrier generated by the transmitter 14B is identified as OC2. It is noted that several transmitters 14 may be coupled to the optical fiber 20, each generating a respective optical carrier. Each optical carrier is typically Wavelength Division Multiplexed (WDM) so they do not interfere with one another down the optical fiber 20. For reference, each optical carrier is also known as an optical channel.

System 10 can be seen to include a plurality of polarization mode dispersion compensators (PMDCs) 30 provided along the length of the optical fiber 20. Each optical channel is seen to have a plurality of spaced PMDCs 30. For the optical carrier OC1, PMDC 30A and PMDC 30B actively compensate for the polarization dependent timing differences, at respective locations, of the respective optical carrier traveling through the optical fiber 20. For the optical carrier OC1, the PMDC 30A and 30B continuously sense the timing difference between the pair of orthogonal polarizations at that point in the fiber, and selectively delay one polarization to realign the timing between the two signal halves before passing the signal on. As the polarization characteristics of the optical fiber 20 change, each PMDC 30 constantly monitors the optical carrier and adjusts the delay to minimize the PMD contribution to overall dispersion. Each PMDC 30 provides several PMD notifications to the PMD fault detector 12 on respective output lines 36 and 38.

The PMD notifications can include:

I. the PMD compensator is approaching the limit of its compensating ability;

II. the optical signal has exceeded the compensating range of the PMD compensator;

III. the range of change of the PMD exceeds a predetermined characteristic value or exceeds a tracking speed of the compensator; and/or IV. an element in the PMD compensator has failed.

Optical carrier OC1 is further seen to have a plurality of optical amplifiers 32 amplifying the respective optical carrier to ensure the optical carrier has sufficient strength at the receive end of the link.

System 10 includes PMDCs 30C and 30D along the optical fiber 20 for actively compensating the optical carrier identified as OC2. PMDCs 30C and 30D are tuned to the optical frequency corresponding to the optical carrier OC2. The spaced PMDC 30C and PMDC 30D actively compensate the polarization-dependent timing differences of the optical carrier OC2, similar to the active compensation of the optical carrier OC1 provided by PMDC 30A and PMDC 30B. As the polarization characteristics of the optical fiber 20 change and affect the optical carrier OC2, PMDCs 30C and 30D constantly monitor the optical carrier OC2 at the respective locations and adjust the delay of one polarization to minimize the PMD contribution to overall dispersion. PMDC 30C and 30D also provide several PMD notifications to PMD fault detector 12 on respective output lines 40 and 42, similar to the notifications provided by PMDC 30A and 30B. PMDC 30A and 30C are collocated along the optical fiber 20. Likewise, PMDC 30B and 30D are collocated along the optical fiber 20 and spaced from PMDC 30A and 30C.

According to the present invention, PMD fault detector 12 actively monitors and processes the received PMD notifications provided on input lines 36, 38, 40, and 42 from PMDCs 30A, 30B, 30C and 30D, respectively. PMD fault detector 12 correlates the PMD notifications from the PMDCs across the multiple optical channels, namely, optical channels OC1, OC2, and any other optical channels communicated across the optical fiber 20. Thus, limitation to only two optical channels, or only two PMDCs per channel is not to be inferred because multiple optical channels in excess of two, and multiple PMDCs per channel in excess of two, can be provided.

PMD fault detector 12 correlates the outputs from the respective PMDC 30 to determine if a PMD problem is isolated to one particular optical carrier or if the PMD problems are related to more than one optical carrier.

If the PMD problem is related to only one or more PMDCs 30 associated with one particular optical carrier, such as OC1 or OC2, the PMD fault detector 12 proceeds to resolve whether or not there is in fact a PMD problem and whether or not one PMDC is malfunctioning, such as disclosed in the commonly assigned patent application filed on 09/217,357 entitled "Fault Isolation of an Optical Link by Correlating PMD Events with Other Measurements", Attorney Docket No. RIC-98–012, the teachings of which are incorporated herein by reference. Thus, the PMD fault detector 12 determines whether or not a particular PMDC 30 is malfunctioning and can avoid taking unnecessary control or maintenance actions upon a PMD related problem that may be erroneously reported by the PMDC 30.

When PMD fault detector 12 determines that multiple PMDCs 30 across multiple optical channels are generating PMD notifications indicating a PMD problem, PMD fault detector 12 generates an output signal on output line 50 indicative of a PMD problem that is attributed to bulk fiber disturbances rather than PMDC malfunctions. Thus, the present invention tempers corrective actions that would normally be taken to correct PMD problems by refraining from adjusting PMD equipment, such as PMD related controllers and PMDCs 30, when the PMD problem is related to the optical fiber 20 as a whole.

The PMD fault detector 12 further identifies which portion of the optical fiber 20 has undergone a change in polarization characteristics by correlating the outputs of the PMDCs 30 with one another. For instance, since the PMDC 30A associated with optical carrier OC1 is co-located along the optical fiber 20 with the PMDC 30C associated with the optical carrier OC2, the correlation of PMD notifications provided by the PMDCs 30A and 30C on output lines 36 and 40, respectively, indicate PMD problems thereat, PMD fault detector 12 then determines that there is a PMD problem along the fiber portion at the location where the PMDC 30A and the PMDC 30C reside. Likewise, since the PMDC 30B associated with optical carrier OC1 and the PMDC 30D associated with the optical carrier OC2 are collocated along the optical fiber 20, the PMD fault detector 12 correlates the outputs provided on respective output lines 38 and 42 to determine that there is PMD related problem at the location where the PMDCs 30B and 30D reside. Thus, PMD fault detector 12 isolates a PMD problem to a particular location along the optical fiber 30 when there is a bulk fiber disturbance generating a PMD problem across multiple channels of the optical fiber 20.

PMD fault detector 12 is further seen to include a history list 52 for maintaining, in memory, a recent history of the PMD observations over time for each optical channel provided by the various PMDCs 30. The PMD fault detector 12 utilizes the history list 52 of recent PMD notifications, whereby the PMD notifications provided by the respective PMDCs 30 associated with each separate optical carrier OC1 and OC2 are characterized over time. Any sudden shifts of associated PMD measurements at a particular time, or over a period of time, can be attributed to bulk fiber disturbances rather than PMDC malfunctions. This distinction is used to temper corrective actions that would normally be taken to correct PMD problems, such as rotating the angle of a PMD controller as disclosed in commonly assigned patent application filed on 09/220,732 entitled "Method of Limiting PMD in an Optical Communications Link", Attorney Docket No. RIC-98–013, the teachings of which are incorporated herein by reference. Correlating the PMD notifications allows the system 10 to refrain from taking unnecessary control or maintenance actions upon PMD related controllers and PMDCs when the PMD problems are actually attributed to bulk fiber disturbances. The system 10 refrains from disrupting traffic bearing and revenue bearing traffic along the optical fiber 20 except when it is intelligently determined that such corrective actions would be advantageous to improve quality and reduce the PMD problems in the optical fiber 20.

The history list 52 allows the PMD fault detector 12 to observe a simultaneous shift in the PMD, which is of substantially the same magnitude, across the optical channels or a "same" rate of change of PMD across the optical channels as indicated by the PMDCs 30 across the optical channels. Thus, history list 52 further allows the PMD fault detector 12 to correlate the PMD notifications provided on input lines 36, 38, 40 and 42 as a function of magnitude and rate of change to correlate the PMD problems across the optical channels.

Figure 4:
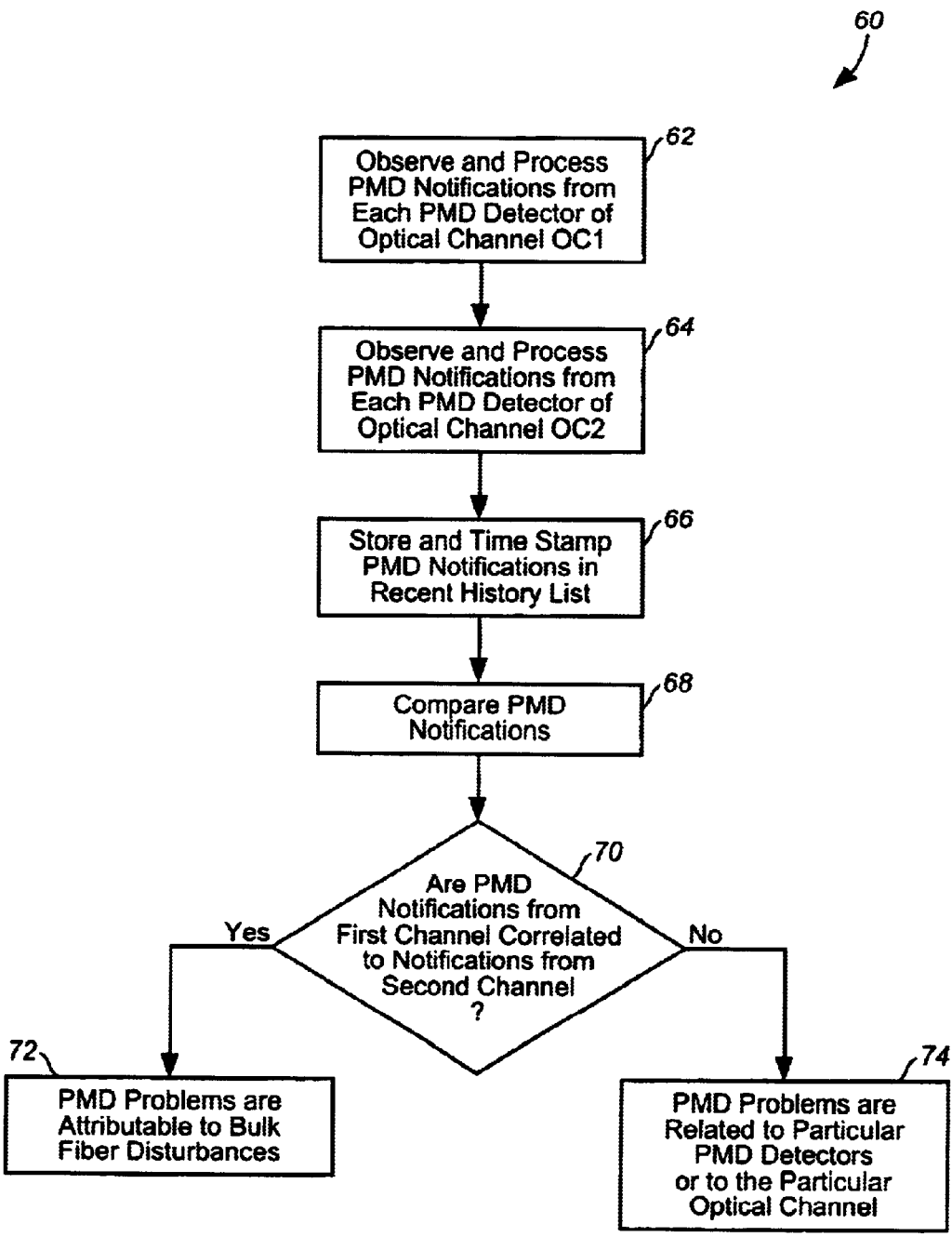
FIG. 4 is a flow chart illustrating how the PMD fault detector ascertains and processes several inputs from the multiple PMD detectors to distinguish between bulk fiber PMD disturbances and PMD problems related to the particular PMD detectors and/or respective optical channels.

Referring now to FIG. 4, a flow diagram 60 shows a method performed by the PMD fault detector 12 to determine and correlate PMD problems across the optical channels and across the optical fiber 20. At step 62, the PMD fault detector 12 observes and processes PMD notifications from PMDC 30A and PMDC 30B associated with the optical carrier OC1 provided on output lines 36 and 38, respectively.

At step 64, the PMD fault detector 12 observes and processes PMD notifications from PMDC 30C and PMDC 30D associated with the optical carrier OC2 as provided on output lines 40 and 42, respectively.

At step 62 and 64, the method allows for the PMDCs 30 for each optical channel to settle into a relatively steady state.

At step 66, the PMD fault detector 12 stores the PMD notifications in the history list 52 and time stamps the PMD notifications.

At step 68, the PMD fault detector 12 compares the PMD notifications from all of the PMDCs 30 in relation to one another as a function of time and as a function of magnitude.

At decision step 70, the PMD fault detector 12 determines whether or not the PMD notifications from the optical carrier OC1 correlate to the PMD notifications from the PMDCs 30 associated with the optical carrier OC2. If the answer is YES, then the method proceeds to step 72 and generates an output signal on output line 50 indicative of the fact that the PMD problems in the optical fiber 20 are attributable to bulk fiber disturbances and are not necessarily related to PMDC 30 malfunctions.

If at decision step 70 the answer is NO, then the method proceeds to step 74 and generates an output signal on output line 50 indicative of the fact the PMD problems are related to a particular PMDC and/or a particular optical channel. The method proceed to attempt to correct the PMD problem associated with the particular optical carrier. For instance, it can be determined that one particular PMDC, such as PMDC 30A, is malfunctioning and corrective maintenance action can be taken. This may be done when it is determined that PMD problems are not attributable to bulk fiber disturbances across the optical fiber 20.

Although the invention has been described with respect to a specific preferred embodiment, many variations and modifications will become apparent to those skilled in the art upon reading the present application. Therefore, it is intended that the appended claims be interpreted as broadly as possible to include all such variations and modifications.

What is claimed is:

1. A method of performing fault management in an optical communications link having a plurality of optical channels, each channel having associated therewith at least one Polarization Mode Dispersion (PMD) detector generating an output indicative of PMD for the respective optical channel at the PMD detector, the method comprising the steps of:

obtaining a first output from a first PMD detector associated with a first optical channel;

obtaining a second output from a second PMD detector associated with a second optical channel; and correlating said first output with said second output to determine a fault of the optical communications link and generating a fault signal indicative of said fault.

2. The method of claim 1 wherein said first PMD detector and said second PMD detector are collocated along the optical communications link at a first location.

3. The method of claim 1 further comprising the step of obtaining a third output from a third PMD detector associated with said first optical channel, wherein in said third output is correlated with said first output and said second output to determine a second fault of the optical communications link.

4. The method of claim 3 further comprising the step of obtaining a fourth output from a fourth PMD detector associated with said second optical channel, wherein in said fourth output is correlated with said first output, said second output, and said third output to determine a third fault of said optical communications link.

5. The method of claim 4 wherein said third PMD detector and said fourth PMD detector are collocated along the optical communications link at a second location.

6. The method of claim 5 wherein said fault signal is indicative of a bulk fiber disturbance at one of said first and said second locations.

7. The method of claim 5 wherein said first location and said second location are separated from one another.

8. The method of claim 1 wherein said first output and said second output are indicative of a magnitude of a PMD shift in said first optical channel and said second optical channel, respectively.

9. The method of claim 1 wherein said first output and said second output are indicative of a rate of change of a PMD shift in said first optical channel and said second optical channel, respectively.

10. The method of claim 1 further comprising the step of maintaining a history of said first output and history of said second output, wherein said step of correlating correlates said history of said first output and said history of said second output to determine said fault of the optical communications link.

11. An optical communications system, comprising:
an optical fiber;
an optical transmitter coupled to said optical fiber for generating a first optical channel and a second optical channel through said optical fiber;
a first Polarization Mode Dispersion (PMD) detector and a second PMD detector coupled to said optical fiber for generating a first output and a second output, respectively, indicative of PMD of the first optical channel and the second optical channel, respectively, at a first location; and
a fault detector coupled to said first PMD detector and said second PMD detector for generating a fault output as a function of said first output and said second output indicative of a PMD problem in said optical fiber.

12. The system of claim 11 wherein said first location and said second location are separated from one another.

13. The system of claim 11 further comprising:
a third PMD detector coupled to said optical fiber for generating a third output indicative of PMD for the first optical channel at a second location; and
a fourth PMD detector coupled to said optical fiber for generating a fourth output indicative of PMD for the second optical at said second location.

14. The system of claim 13 wherein said fault detector determines the cause of the PMD problem of at least one of said PMD detectors.

15. The system of claim 13 wherein said fault output is indicative of which of said PMD detectors is failing.

16. The system of claim 13 wherein said fault output is indicative of whether a perturbation of a fiber characteristic is at said first location or said second location.

17. The system of claim 11 further comprising means to maintain a history of said first output and said second output over time.

18. The system of claim 17 wherein said fault detector generates said fault output as a function of said history of said first output and said second output.

19. The system of claim 11 wherein said first output and said second output are indicative of a magnitude of a PMD shift in said first optical channel and said second optical channel, respectively.

20. The system of claim 11 wherein said first output and said second output are indicative of a rate of change of a PMD shift in said first optical channel and said second optical channel, respectively.

* * * * *